L. W. PALMER.
LOADING MACHINE.
APPLICATION FILED APR. 30, 1919.

1,362,347.

Patented Dec. 14, 1920.
2 SHEETS—SHEET 1.

WITNESS
T. F. Dilworth

INVENTOR.
Leon W. Palmer
By Jas R Snyder
attorney

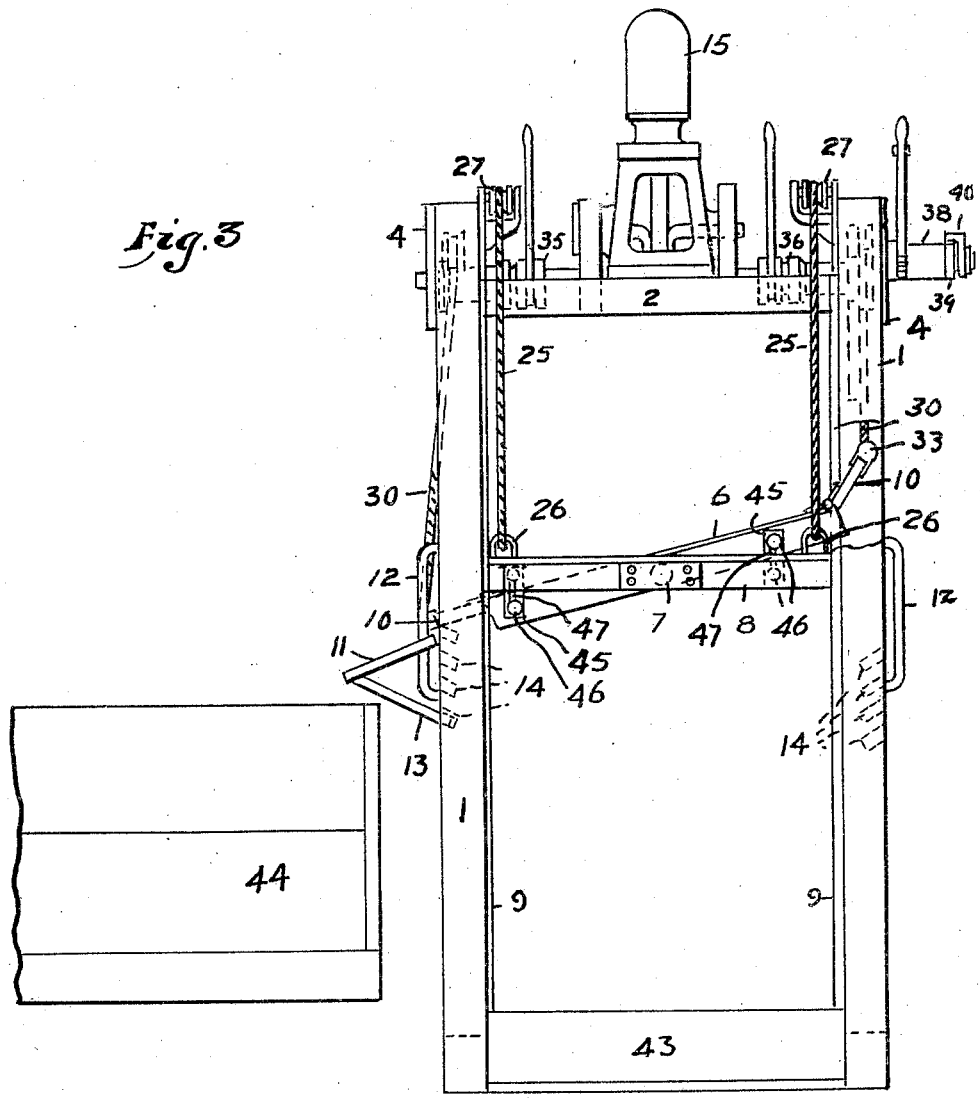

UNITED STATES PATENT OFFICE.

LEON W. PALMER, OF UNITY STATION, PENNSYLVANIA.

LOADING-MACHINE.

1,362,347.  Specification of Letters Patent.  Patented Dec. 14, 1920.

Application filed April 30, 1919. Serial No. 293,636.

*To all whom it may concern:*

Be it known that I, LEON W. PALMER, a citizen of the United States, residing at Unity Station, in the county of Allegheny and State of Pennsylvania, have invented certain new and useful Improvements in Loading-Machines, of which the following is a specification.

This invention relates to loading machines, designed primarily for use in connection with the loading of railway cars, but it is to be understood however that the machine can be employed for any purposes wherein it is found applicable, and has for its object to provide a machine of such class, in a manner as hereinafter referred to, with means for receiving and elevating the material to be loaded and then dumping it into a car or other receptacle in a manner whereby the loading operation is not only facilitated, but is carried on at minimum expense, labor and waste.

Further objects of the invention are to provide a machine for the purpose set forth which is simple in its construction and arrangement, strong, durable, efficient and convenient in its use, readily set up and operated, and comparatively inexpensive.

With the foregoing and other objects in view the invention consists of the novel construction, combination and arrangement of parts as hereinafter more fully set forth, and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Fig. 3 is an end view of the device showing the platform in the dumping position.

Figure 1:
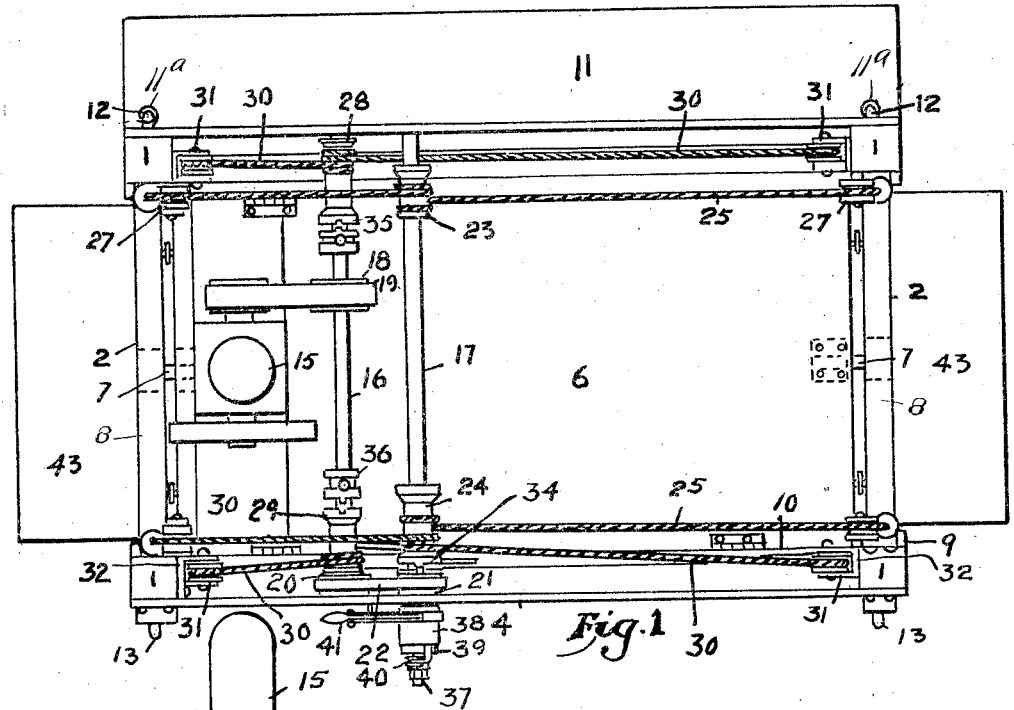
Figure 1 is a top plan view of a loading machine in accordance with this invention.
Figure 2:
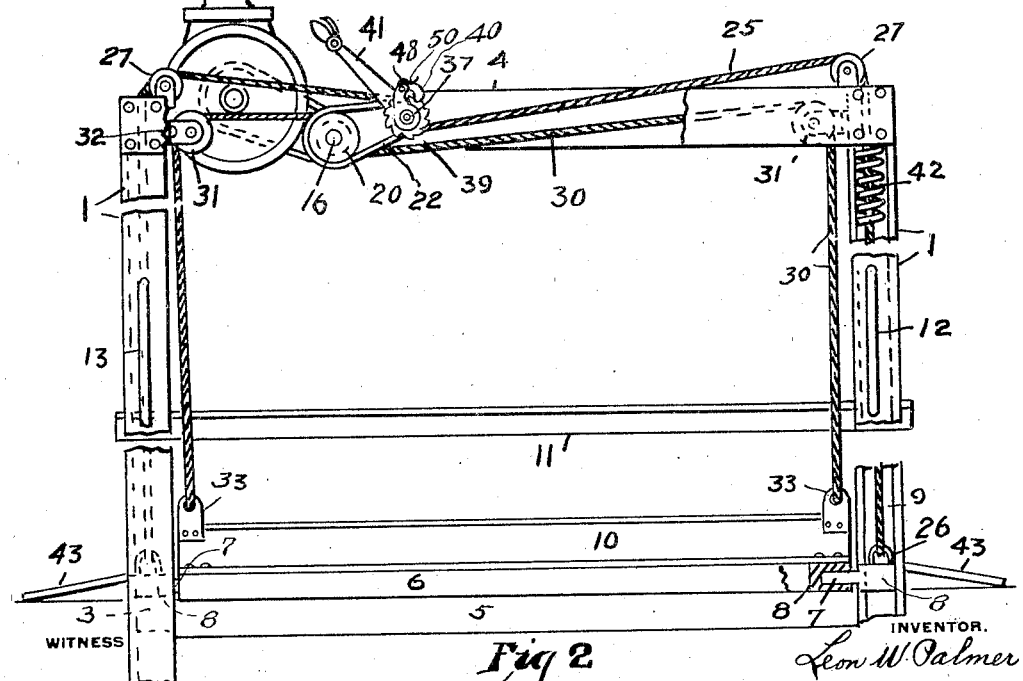
Fig. 2 is a side elevation thereof with portions broken away.

Referring more in detail to the drawings the loading machine consists of a preferably rectangularly framed structure comprising the four vertical supports 1, one at each corner of the structure, the upper end members 2, the lower end members 3, the upper side members 4 and the lower side members 5.

A platform 6, tiltably mounted at 7 in the carriers 8, is arranged for vertical movement in the framing structure. The vertical grooves 9 formed on the inner surfaces of the vertical supports 1, serve as guides for the carriers 8. The tilting movement of the platform 6 is limited by a strap 45, having an elongated slot 47 and which connects each end of the carriers 8 to the platform 6, by means of the pins 46 slidably engaged in said slots 47. Side-boards 10, extending along the sides of the platform 6, are hingedly connected thereto for the purpose hereinafter set forth.

A horizontally extending adjustable chute 11, provided with apertures 11$^a$, is attached to the side of the framing structure by the vertically extending brackets 12, one of which is removably mounted in each of the supports 1 in any suitable manner, and which pass, respectively, through the apertures 11$^a$ in the chute 11. Angularly disposed braces 13 are fixedly secured to the under side of the chute 11 and are adapted to detachably engage in the angularly extending holes 14, formed in the supports 1, for the purpose of rigidly supporting the chute 11, at an angle, to permit the flow of material therefrom by gravity into the car or bin 44, which is positioned beneath the chute 11. Each of the supports 1 is provided with a plurality of angularly extending alined holes 14, one above the other, which in connection with the slidable attachment of the chute 11, through apertures 11$^a$, on the brackets 12, permits the vertical adjustment of the chute 11 relative to the framing structure. Either side of the structure may be used for carrying the chute 11.

An engine 15 is suitably mounted and supported in the framing structure near the upper end thereof. The shafts 16 and 17, suitably journaled in the upper side members 4, extend transversely across the framing structure. Shaft 16 carries the drive pulley 18 which is driven by the belt 19 from the engine 15. The shaft 16 is adapted to rotate with the drive pulley 18 and also carries the pulley 20 to revolve therewith. Loosely mounted on the shaft 17 is the pulley 21 which is driven by the belt 22 from the pulley 20, on the shaft 16.

The drums 23 and 24 are fixedly mounted on the shaft 17 to turn therewith. Cables 25, having one end thereof attached to the end of the carriers 8, as at 26, pass over the sheaves 27, one of which is mounted at each corner of the framing structure. The other ends of the cables 25 are respectively attached to the drums 23 and 24 to be wound thereon when the said drums are rotated.

Loosely mounted on the shaft 16, are the drums 28 and 29, upon which are adapted to wind the cables 30. The cables 30 pass over the sheaves 31, attached to the framing structure, as at 32, and are connected at 33 to the side-boards 10.

A clutch 34 is arranged on the shaft 17 and when thrown into engagement with the pulley 21 operates to turn the shaft 17 and the drums 23 and 24, fixedly mounted thereon. Mounted on the shaft 16 are the clutches 35 and 36, operable to actuate the drums 28 and 29, respectively, on the shaft 16.

Cables 25, winding respectively on drums 23 and 24 and attached to the carriers 8, are adapted to carry the platform 6 with load, while cables 30, winding respectively on drums 28 and 29 and attached to the side boards 10, are adapted to steady the platform 6 evenly and prevent the tilting thereof on pivot 7 during the hoisting operation. Except during the dumping operation, as hereinafter described, the cables 25 and 30 are wound and unwound upon their respective drums in unison with respect to each other.

The shaft 17 is provided with the extension 37 which carries the roller 38, loosely mounted thereon. The outer end of the roller 38 is formed with the teeth 39 which are engaged by the ratchet pawl 40 mounted on and adapted to turn with the shaft 17.

The brake 41, for locking and releasing the roller 38, is provided for the purpose of holding the platform 6 in the elevated position during the dumping operation and for controlling the lowering operation of the said platform after the dumping operation.

A cushioning element or spring 42 is mounted in the upper end of the groove 9 of each of the vertical supports 1, and act as buffers for limiting the upward movement of the carriers 8 in the grooves 9 and for jarring the material from the platform 6 during the dumping operation.

Approaches 43 are provided to facilitate the driving of a truck or wagon on and off the platform 6.

In practice the operation of the loading machine is as follows: The machine is positioned at the side of a car or bin, as at 44, and the chute 11 adjusted, as shown in Fig. 3, to extend over the upper portion of the bin or car. The truck is driven upon the platform 6 and the contents dumped thereon. Clutches 35 and 36 are operated to engage the drums 28 and 29 respectively, while the clutch 34 is operated to engage the shaft 17. The engine 15 is started, and the drums 23, 24, 28 and 29 being of the same diameter and rotating with the same speed, the cables 25 and 30 will wind thereon and elevate the platform 6 evenly in the framing structure. When the platform has been elevated to a position in alinement with the chute 11, the engine 15 is stopped and the brake 41 is set to hold the platform in the said elevated position. Clutch 34 is now disengaged to stop the rotation of the shaft 17. The clutch 35 is also thrown out of engagement, releasing the drum 28. The engine 15 is again started with only the clutch 36 in the operative position, causing the winding up of the cables 30 upon the drum 29 to elevate but one side of the platform 6, which is now brought to the tilted position, as shown in Fig. 3, and the drum 28 being in the released position the side-board at the lower end of the tilted platform 6 will fall outwardly upon the chute 11 and permit the material upon the platform 6 to be projected into the car or bin 44.

After the dumping operation the clutch 36 is released and the platform 6 allowed to descend, by releasing the brake 41, to its original position.

From the foregoing description taken in connection with the accompanying drawings the construction and method of operation of the device will be readily apparent to those skilled in the art without a more extended explanation, and it is to be understood that changes, variations and modifications may be made in the form, proportion and minor details of construction as come within the scope of the claims hereunto appended.

What I claim as new and desire to secure by Letters Patent is:

1. A loading machine comprising a vertically movable carrier, a dumping platform supported thereby and moving vertically therewith, elevating and lowering cables for said carrier, cables for shifting the platform on its pivots to dumping position, said last mentioned cables winding up during the hoisting of the carriage thereby providing means to maintain the platform from swinging on its pivots until certain of such cables are wound to act on one side of the platform, and a common operating means for all cables.

2. A loading machine comprising a vertically movable carrier, a dumping platform supported thereby and moving vertically therewith, elevating and lowering cables for said carrier, cables for shifting the platform on its pivots to dumping position, said last mentioned cables winding up during the hoisting of the carriage thereby providing means to maintain the platform from swinging on its pivots until certain of such cables are wound to act on one side of the platform, means for limiting the dumping movement of the platform, and means for controlling the lowering movement of the carrier.

3. A loading machine comprising a vertically movable carrier, a dumping platform supported thereby and moving vertically therewith, elevating and lowering cables for said carrier, cables for shifting the platform on its pivots to dumping position, said last mentioned cables winding up during the hoisting of the carriage thereby providing means to maintain the platform from swinging on its pivots until certain of such cables are wound to act on one side of the platform, a common operating means for all of said cables, and an adjustable material directing member associated with said platform.

4. A loading machine comprising a vertically movable carrier, a dumping platform supported thereby and moving vertically therewith, elevating and lowering cables for said carrier, cables for shifting the platform on its pivots to dumping position, said last mentioned cables winding up during the hoisting of the carriage thereby providing means to maintain the platform from swinging on its pivots until certain of such cables are wound to act on one side of the platform, and an adjustable material directing members associated with the said platform.

In testimony whereof I affix my signature.

LEON W. PALMER.